(12) United States Patent
Hsu et al.

(10) Patent No.: US 10,091,167 B2
(45) Date of Patent: *Oct. 2, 2018

(54) NETWORK TRAFFIC ANALYSIS TO ENHANCE RULE-BASED NETWORK SECURITY

(71) Applicant: International Business Machines Corporation, Armonk, NY (US)

(72) Inventors: Sheng-Tung Hsu, Taipei (TW); Chien Pang Lee, Taipei (TW); Pei-Chun Yao, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/599,211

(22) Filed: May 18, 2017

(65) Prior Publication Data

US 2017/0339108 A1  Nov. 23, 2017

Related U.S. Application Data

(63) Continuation of application No. 14/448,705, filed on Jul. 31, 2014, now Pat. No. 9,660,959.

(30) Foreign Application Priority Data

Jul. 31, 2013  (TW) .............................. 102127546 A

(51) Int. Cl.
H04L 29/06  (2006.01)

(52) U.S. Cl.
CPC ...... *H04L 63/0254* (2013.01); *H04L 63/0263* (2013.01); *H04L 63/1425* (2013.01); *H04L 63/20* (2013.01)

(58) Field of Classification Search
CPC ............. H04L 63/0263; H04L 63/0227; H04L 63/0236; H04L 63/0245
See application file for complete search history.

(56) References Cited

U.S. PATENT DOCUMENTS 6,279,113 B1  8/2001  Vaidya
6,826,698 B1  11/2004  Minkin et al.
(Continued)

FOREIGN PATENT DOCUMENTS

WO  WO2009128881 A1  10/2009

OTHER PUBLICATIONS

"Defining Rules for an IPS Rulebase," Juniper Networks, Inc., copyright 1999-2010, 4 pages. Accessed Jul. 7, 2014, https://www.juniper.net/techpubs/software/junos-security/junos-security10.0/junos-security-swconfig-security/config-idp-ips-rulebase-section.html.
(Continued)

*Primary Examiner* — Izunna Okeke
*Assistant Examiner* — Hee K Song
(74) *Attorney, Agent, or Firm* — Yee & Associates, P.C.; Robert Shatto

(57) ABSTRACT

A method of interpreting a rule and a rule-interpreting apparatus for rule-based security apparatus, and an apparatus implementing the method. The method comprises the following steps: designating a suspicious timeslot; if any packet does not present in the designated timeslot, capturing current incoming packets or capturing other incoming packets in the designated timeslot next time; automatically associating the packets in the designated timeslot to form at least one traffic flow corresponding to a connection or call; analyzing the at least one traffic flow to select at least one suspicious target traffic flow; and outputting the at least one selected suspicious target flow.

5 Claims, 6 Drawing Sheets

(56) References Cited

U.S. PATENT DOCUMENTS

| | | | |
|---|---|---|---|
| 7,966,655 | B2 | 6/2011 | Acharya et al. |
| 7,966,659 | B1 | 6/2011 | Wilkinson et al. |
| 8,881,272 | B2 | 11/2014 | Bunker et al. |
| 9,392,010 | B2 | 7/2016 | Friedman et al. |
| 9,660,959 | B2 | 5/2017 | Hsu et al. |
| 2005/0182950 | A1 | 8/2005 | Son et al. |
| 2007/0011741 | A1 | 1/2007 | Robert et al. |
| 2007/0050846 | A1 | 3/2007 | Xie et al. |
| 2008/0163333 | A1 | 7/2008 | Kasralikar |
| 2009/0077617 | A1* | 3/2009 | Levow .............. H04L 51/12 726/1 |
| 2010/0031358 | A1 | 2/2010 | Elovici et al. |
| 2012/0054825 | A1 | 3/2012 | Bassett et al. |
| 2012/0233656 | A1* | 9/2012 | Rieschick ........ H04L 63/1441 726/1 |
| 2012/0311562 | A1 | 12/2012 | Wang et al. |
| 2013/0269033 | A1 | 10/2013 | Amaya et al. |
| 2013/0312092 | A1 | 11/2013 | Parker |
| 2014/0075557 | A1 | 3/2014 | Balabine et al. |
| 2014/0157405 | A1 | 6/2014 | Joll et al. |
| 2014/0181968 | A1 | 6/2014 | Ge et al. |
| 2015/0047026 | A1 | 2/2015 | Neil et al. |
| 2015/0350161 | A1 | 12/2015 | Hsu et al. |
| 2016/0164893 | A1 | 6/2016 | Levi |

OTHER PUBLICATIONS

"Network Security," Microsoft, copyright 2014, 1 page. Accessed Jul. 7, 2014, http://technet.microsoft.com/en-us/library/cc725616.aspx.

"Palo Alto Next Generation Firewall," Feb. 2010, 30 pages. Accessed Jul. 7, 2014, http://manna-in-the-wild.hubpages.com/hub/Palo-Alto-Next-Generation-Firewall.

"SecureTrack: Securing Network Segments and Optimizing Permissive Rules with the Automatic Policy Generator," White Paper, Tufin Software Technologies, Ltd., Mar. 2012, 7 pages.

"Snort," Sourcefire, Inc., copyright 2009, 5 pages. Accessed Jul. 7, 2014, http://snort.org/snort-rules.

O'Hara, "4.3 Firewall Rules," Guardian Digital Web Toll Firewall HOWTO, Guardian Digital, Inc., Jan. 2006, 5 pages. Accessed Jul. 7, 2014, http://engardelinux.org/doc/howtos/webtool-firewall-howto/webtool-firewall-howto/x168.shtml.

Pranschke et al., "Automated Firewall Rule Set Generation Through Passive Traffic Inspection," Information Security for South Africa: Proceedings of the the ISSA 2009 Conference, Jul. 2009, pp. 243-251.

Scarfone et al., "Guidelines on Firewalls and Firewall Policy: Recommendations of the National Institute of Standards and Technology," U.S. Department of Commerce Special Publication 800-41, Sep. 2009, 48 pages.

Uribe et al., "Automatic Analysis of Firewall and Network Intrusion Detection System Configurations," SDL Technicaly Report SRI-SDL-04-04, Sep. 7, 2004, 26 pages.

Office Action dated Oct. 15, 2015, regarding U.S. Appl. No. 14/448,705, 18 pages.

Final Office Action dated Mar. 16, 2016, regarding U.S. Appl. No. 14/448,705, 14 pages.

Office Action dated Mar. Aug. 5, 2016, regarding U.S. Appl. No. 14/448,705, 11 pages.

Notice of Allowance dated Jan. 13, 2017, regarding U.S. Appl. No. 14/448,705, 18 pages.

* cited by examiner

```
▷ Internet Protocol, Src: 1.0.0.0 (1.0.0.0), Dst: 208.21.5.130 (208.21.5.130)
    Version: 4
    Header length: 20 bytes
  ▷ Differentiated Services Field: 0x00 (DSCP 0x00: Default; ECN: 0x00)
    Total Length: 1500
    Identification: 0x49e3 (18915)
  ▽ Flags: 0x01 (More Fragments)
    0... .... = Reserved bit: Not set
    .0.. .... = Don't fragment: Not set
    ..1. .... = More fragments: Set
    Fragment offset: 0
    Time to live: 254
    Protocol: IGMP (2)
  ▷ Header checksum: 0x76a5 [correct]
    Source: 1.0.0.0 (1.0.0.0)
    Destination: 208.21.5.130 (208.21.5.130)
▷ Internet Group Management Protocol
```

FIG.4C

NETWORK TRAFFIC ANALYSIS TO ENHANCE RULE-BASED NETWORK SECURITY

CROSS-REFERENCE TO RELATED APPLICATIONS

This application is a continuation of and claims the benefit of priority to U.S. patent application Ser. No. 14/448,705, filed Jul. 31, 2014, which is based on and claims the benefit of priority from Taiwan Patent Application 102127546, filed on Jul. 31, 2013. The entire contents of both aforementioned applications are incorporated herein by reference.

BACKGROUND OF THE INVENTION

Field of the Invention

The present invention is related to a method of interpreting a rule and a rule-interpreting apparatus for a rule-based security apparatus.

Description of the Prior Art

FIG. 1 shows a schematic diagram of a common conventional enterprise network. A user at an external endpoint 101 accesses a network connecting device 106 serving as a demilitarized zone (DMZ) 105 in an enterprise via an external network 103. The network connecting device 106 may be a device capable of controlling a direction for forwarding network packets, such as a switch, a bridge or a router. A common network rule-based security apparatus (e.g., a firewall, an intrusion detection system (IDS), or an intrusion prevention system (IPS)) may also be set up in the DMZ 105 and coupled with the network connecting device 106. For example, the architecture of the network connecting device 106 may be a Cisco Catalyst 3550 Series Switch manufactured by Cisco. For example, an internal network resource 107 may be any information appliance or server, and may include information appliances and/or servers in different quantities. For example, the internal network resource 107 may represent a local area network (LAN). An information appliance, also commonly known as an Internet appliance, is a device built-in with network capabilities and having a specific function. Compared to a general-purpose computer device, an information appliance offers higher performance as it is designed based on a specific goal or a specific service for performing a specific transaction.

The internal network resource 107 may be a virtual local area network (VLAN). For internal resources within an enterprise or organization, via the VLAN technique, a network administrator may implement logic grouping for appliances in different physical local networks to provide more comprehensive information security and protection.

Further, in a common enterprise or organization, to ensure the security of internal information, a virtual private network (VPN) is adopted to provide a VPN server in the DMZ 105 in order to allow a user to access internal resources via an external connection. Such approach may be referred to a technical document "WebSphere Everyplace Connection Manager: increasing mobile security, reducing wireless costs" published on the Applicant's official website. The VPN server is coupled to the network connecting device 106. A user at the external endpoint 101, having been verified and authorized after logging in the VPN server, may connect to the network connecting device 106 via the VPN. It should be noted that, in some embodiments, the VPN server is optional. That is to say, the VPN is not necessary for the user at the external endpoint 101 to connect to the network connecting device 106 and the internal network resource 107. Further, although not depicted, associated hardware and software components (e.g., additional computer systems, routers and firewalls etc.) may be included in the external network 103 between the VPN server (or the network connecting device 106) and the external endpoint 101.

More related information may be referred to technical documents "IBM SmartCloud Enterprise tip: Build multiple VPNs and VLANs: VPN and VLAN features and capabilities in IBM SmartCloud Enterprise 2.0" and "IBM SmartCloud Enterprise tip: Span virtual local area networks Provision and configure an instance that spans a public and private VLAN" published by Andrew Jones et al. on the Applicant's official website.

In an enterprise or organization, to ensure the security of internal information, a network rule-based security apparatus, such as a firewall, anti-virus software, an IDS or an IPS, is also provided to guard against network threats and to ensure network communication security. The rule-based security apparatus includes a set of rules for determining whether traffic received is suspicious. Upon having detected suspicious traffic, the rule-based security apparatus adopts protection measures, such as blocking the packet, declining the connection or generating a warning.

The reliability of the rule-based security apparatus is dependent on a network administrator to maintain appropriate rule sets and configurations, demanding thorough and in-depth knowledge on network threats, network protocols and network application traffic analyzing. For example, to block a packet of a message application, the network protocol and data contents of the corresponding requirements are analyzed to generate a rule that is applied to the rule-based security apparatus. The above process is usually carried out manually, and such is an extremely time-consuming challenge for professionals of network security protection. As current network application diversities and network threats expand at an exponential rate, rules of a rule-based security apparatus are becoming more and more complicated, such that the process of establishing an appropriate rule also becomes more and more time-consuming.

Therefore, it is beneficial to provide a solution without setbacks of complexities of conventional network management for a network administrator.

SUMMARY OF THE INVENTION

The present invention is directed to a rule-interpreting module, which provides an easier, simpler and less complex solution for establishing a rule for a rule-based security apparatus. The type of traffic to be detected is first specified by a user of the rule-based security apparatus, or suspicious network traffic is first obtained, and a rule can be then automatically established. The rule is applied to the rule-based security apparatus to ensure the security of network communication.

As the solution of the present invention reduces complexities in network management, a user of the rule-based security apparatus does not need to be a professional of network security protection. Taking an instant message (IM) system application (e.g., IBM SameTime, Microsoft MSN Messenger, or Yahoo Messenger) for example, in the prior art, when a network administrator applies a conventional solution to detect a network packet in the IDS, the network administrator is required to have a substantial amount of knowledge on IM protocols and capabilities for editing IDS rules. In an application of the present invention, the network administrator only needs to collect suspicious network packets and feed the collected packets into the rule-interpreting module of the present invention. The rule-interpreting module automatically associates the collected packets to form one or more traffic flows corresponding to a connection or call, analyzes the traffic flow(s) to select one or more suspicious target traffic flows, and compares the selected suspicious target traffic flow(s) with a known pattern group of existing threats to identify a pattern that matches the suspicious target traffic flow(s). The identified pattern is then converted into a new rule applicable to the rule-based security apparatus. Thus, the rule-based security apparatus applied with the new rule is capable of detecting the suspicious target traffic flow(s) and taking appropriate actions to ensure the security of network communication. Further, the present invention is also capable of automatically collecting suspicious network packets through a conventional packet capturing mechanism and providing the collected suspicious network packets to the foregoing rule-interpreting module for further processing, thereby reducing workload of network administrators.

According to one embodiment of the present invention, a method of capturing packets, applied to a rule-based security apparatus, is disclosed. The method comprises: designating a suspicious timeslot; if any packet does not present in the designated timeslot, capturing current incoming packets or capturing other incoming packets in the designated timeslot next time; automatically associating the packets in the designated timeslot to form at least one traffic flow corresponding to a connection or call; analyzing the at least one traffic flow to select at least one suspicious target traffic flow; and outputting the at least one selected suspicious target flow.

According to one embodiment of the present invention, a method of generating a rule applied to a rule-based security apparatus is disclosed. The method comprises: comparing known patterns with at least one suspicious target traffic flow to identify at least one pattern matching the at least one suspicious target traffic flow; and converting the at least one matched pattern into the rule applicable to the rule-based security apparatus.

According to one embodiment of the present invention, an information appliance is disclosed. The information appliances comprises: a bus; a memory connected to the bus, wherein the memory comprises a set of instructions; a processing unit connected to the bus, wherein the processing unit is configured to execute the set of instructions to perform the method of any of claims 1 to 5 and to capture packets in a rule-based security apparatus.

According to one embodiment of the present invention, an information appliance is disclosed. The information appliances comprises: a bus; a memory connected to the bus, wherein the memory comprises a set of instructions; a processing unit connected to the bus, wherein the processing unit is configured to execute the set of instructions to perform the method of any of claims 6 to 8 and to generate a rule applied to a rule-based security apparatus.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The following description, the appended claims, and the embodiments of the present invention further illustrate the features and advantages of the present invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

FIG. 4C shows an example of packets included in a suspicious target traffic flow according to an embodiment of the present invention.

DETAILED DESCRIPTION OF THE EMBODIMENTS

Figure 1:
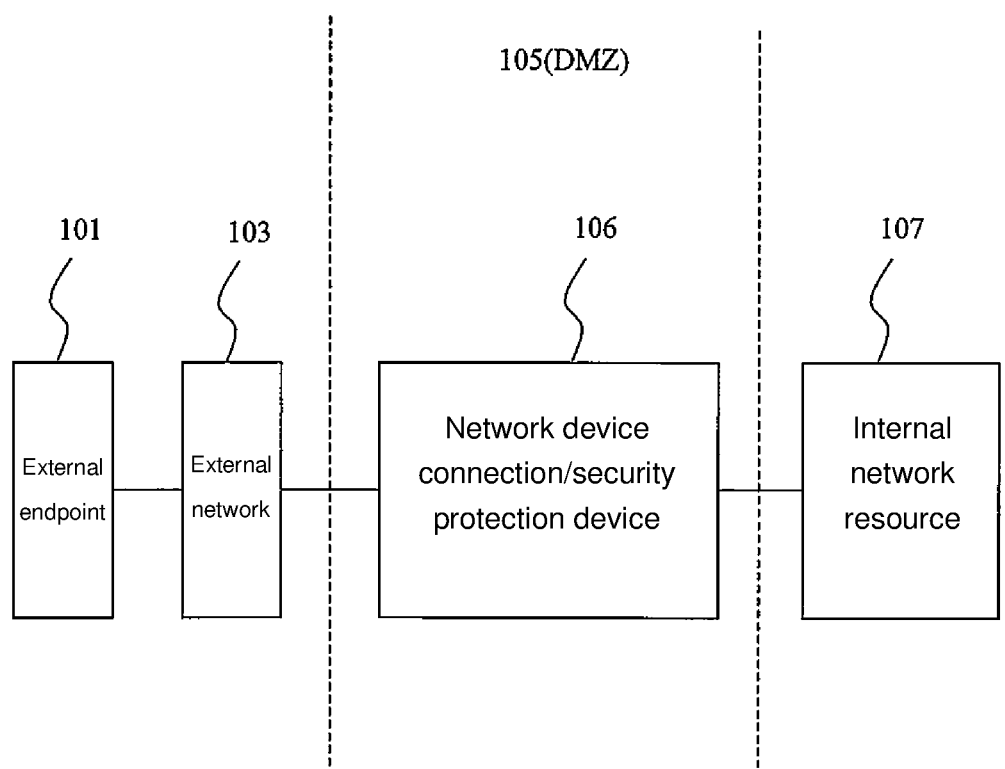
FIG. 1 shows a schematic diagram of a common conventional enterprise network.

Citation of "a specific embodiment" or a similar expression in the specification means that specific features, structures, or characteristics described in the specific embodiment are included in at least one specific embodiment of the present invention. Hence, the wording "in a specific embodiment" or a similar expression in this specification does not necessarily refer to the same specific embodiment.

As will be appreciated by one skilled in the art, the present invention may be embodied as a computer system, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 2 to FIG. 4(C) show a flowchart and a block diagram of a practical architecture, functions and operations of a system, a method and a computer program product according to embodiments of the present invention. Each block in the flowchart or block diagram may represent a module, a segment or a part of a program code, and may include one or more executable instructions to perform a designated logic function. It should be noted that, in other embodiments, the functions depicted by the blocks may be performed in a sequence other than that shown in the figures. For example, two connected blocks in each figure may both be performed, or, with certain functions involved or under certain circumstances, may be performed in a reverse sequence of the sequence shown in each figure. It should be also noted that, each block in each block diagram and/or each flowchart, and combinations of the blocks in each block diagram and/or each flowchart, may be implemented on the basis of a hardware system for a specific purpose or perform specific functions or operations by means of the combination of hardware and computer instructions for a specific purpose.

<Hardware Environment>
<System Architecture>

Figure 2:
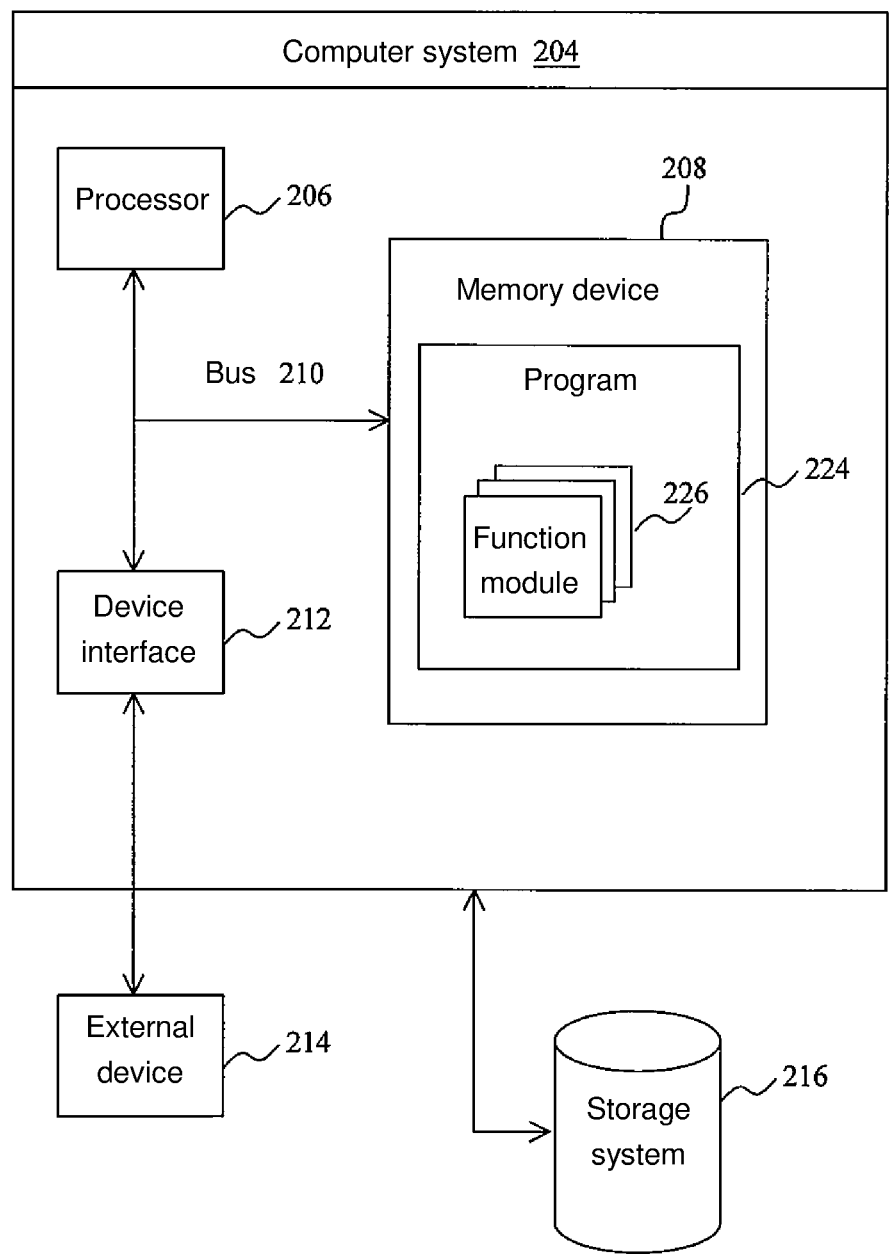
FIG. 2 shows a hardware architecture of a computer system according to one embodiment.

FIG. 2 shows a hardware architecture of a computer system 204 according to one embodiment. The computer system 204 includes a processor 206, a memory device 208, a bus 210, and a device interface 212. The processor 206 accesses a program code, e.g., a program 224, in the memory device 208 or an external storage device 216. The program 224 has one or more function modules 226 for providing functions required in the present invention (to be described with reference to FIG. 3 to FIG. 4(C)), e.g., a rule-interpreting module 300 applied to a rule-based security apparatus (e.g., a firewall, antivirus software, an intrusion detection system (IDS) or an intrusion prevention system (IPS)). The rule-interpreting module 300 may include a packet capturing module 310 and a rule generating module 320 that generates a rule for the rule-based security apparatus. The function modules 226 may be one single instruction or multiple instructions, and may be distributed on multiple different program code segments, different programs, and multiple memory devices 208.

The bus 210 provides communication links between the components in the computer system 204. The computer system 204 establishes a communication link with an external device 214 via the device interface 212. Further, via a network, the computer system 204 may communicate with the external device 214, an external storage device 216, or other computer devices/systems. The network may also be implemented as a connection in any form, including an LAN connection or a WAN connection as a fixed connection, a temporary connection to the Internet via Internet services, or other wired or wireless connection means. It should be noted that, although not depicted, the network may also include other hardware and software components (e.g., additional computer systems, routers or firewalls).

In an alternative embodiment, the fundamental architecture and components of the computer system 204 may also be implemented as a general-purpose computer device, e.g., a personal computer, a server, or an information appliance (e.g., IBM WebSphere Datapower SOA Appliance or Tivoli ISS Appliances, where "IBM", "WebSphere" and "Tivoli" are trademarks of "International Business Machine" in the US and/or other countries).

An embodiment of IDS is given for explaining the present invention, but persons skilled in the art should know that the present invention is not limited thereto.

<Rule-Interpreting Module 300>

Figure 3:
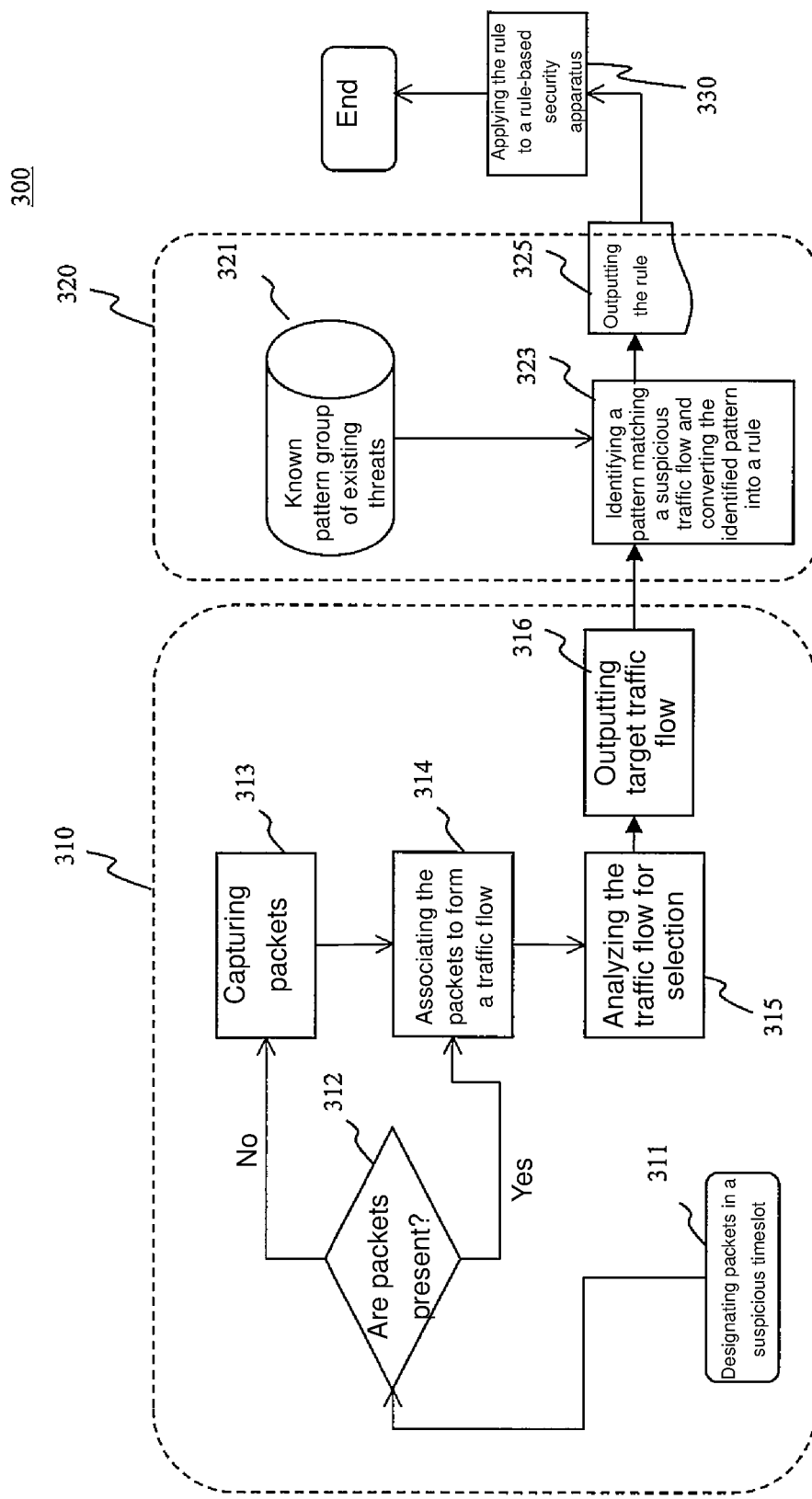
FIG. 3 shows a flowchart of a method according to a "rule-interpreting module" of an embodiment of the present invention.

FIG. 3 shows a flowchart of a method according to a "rule-interpreting module" of an embodiment of the present invention. The rule-interpreting module includes program module and instructions for capturing suspicious packets and for generating a rule for a rule-based security apparatus. The rule-interpreting module 300 may be divided into a packet capturing module 310 and a rule generating module 320 that generates the rule for the rule-based security apparatus.

<Packet Capturing Module 310>

In step 311, a suspicious timeslot is designated. The designation may be determined by the known security information and event management (SIEM) technology or by a network administrator. For example, the SIEM product is QRadar of IBM or McAfee from Nitrosecurity. The SIEM is capable of logging security data as well as generating a report and a warning. Associated details can be referred to the description of SIEM on Wikipedia.

Based on certain abnormal network behaviors in a certain timeslot as designated by an SIEM report and warning, the rule-interpreting module may suspect that the system is under attack. For example, the abnormal behaviors may include system lagging, frequent errors due to incorrect log-in password, and an explosive growth in the amount of browsing the same webpage in a certain timeslot. According to a predetermined principle or strategy, the rule-interpreting module designates a suspicious timeslot and collects packets in the suspicious timeslot for further analysis. Alternatively, having learned a hacker attack event at a certain location on a certain date from the news, the network administrator may directly designate that all packets transmitted via links from that certain IP address at that location on that certain date are all suspicious, and those packets need to be collected for further analysis. That is to say, when the network administrator learns that a type of information from a location in a timeslot is hacked, the network administrator may directly designate that all packets from that location in that timeslot are suspicious.

In step 312, it is determined whether packets in the designated timeslot are present.

In step 313, when the packets in the designated timeslot are not present, current incoming packets are immediately captured, or other incoming packets in the designated timeslot are captured next time. The capture of the packets may be performed by known techniques such as tcpdump or wireshark calling Libpcab.

In a security system, packets received in some timeslots may be recorded according to settings. When the timeslots include the designated timeslot, the packets in the designated timeslot are present.

In step 314, regardless of whether the packets in the designated timeslot are present or captured later, the packet capturing module 310 automatically associates the packets in the designated timeslot to form one or more traffic flows corresponding to a connection or call.

In step 315, the traffic flow is analyzed to select one or more suspicious target traffic flows. The detailed extent for analyzing each traffic flow may be set according to a requirement. Thus, according to the embodiment of the present invention, an IP layer protocol (e.g., IPv4 or IPv6 etc.), a TCP layer protocol (e.g., SMTP, FTP, HTTP or IM etc.), a data format (e.g. HTML, XML, JAVASCRIPT, GIP, WMF, JPG, or E-mail etc.) of the packets in each traffic flow may be analyzed. For example, a traffic flow of an instant message (e.g., IBM SameTime) may be analyzed as IPv4 and the IM protocol of the TCP layer. According to an embodiment of the present invention, the data format may also be analyzed, e.g., the traffic flow includes data in a GIF, XML or HTML format.

The suspicious target traffic flow may be selected from the analyzed traffic flow according to a predetermined principle or strategy. Similarly, the selection of suspicious target traffic flow may be determined by the known SIEM technology or a network administrator. In step 311, when the rule-interpreting module 300 of the present invention demands packets in a certain timeslot according to the SIEM report and warning as well as a predetermined principle or strategy, the suspicious target traffic flow may be selected according to the same predetermined principle or strategy. Further, in step 311, packets in a certain timeslot may also be demanded according to information learned by the network administrator (e.g., a certain type of data at a certain location in a certain timeslot is hacked). With the same principle or strategy, the traffic flow containing packets of the certain type of data may be determined as the suspicious target traffic flow. According to the embodiments of the present invention, the predetermined rule and strategy for filtering the analyzed traffic flow does not need to be the same as the predetermined rule and strategy according to which packets in a suspicious timeslot are designated to be collect in step 311.

In step 316, one or more suspicious target traffic flows are outputted. The one or more suspicious traffic flows are subsequently compared with a known pattern group of existing threats in the rule generating module 320 in order to identify the pattern of the suspicious target traffic flow(s).

<Rule Generating Module 320>

Subsequent operation details of the rule generating module 320 in FIG. 3 are described below with reference to FIGS. 4A to 4C according to an embodiment of the present invention. The rule generating module of the present invention is to be further described by taking an IDS as an example with reference to FIGS. 4A to 4C for better explaining the present invention, and persons skilled in the art should know that the present invention is not limited thereto.

Figure 4A:
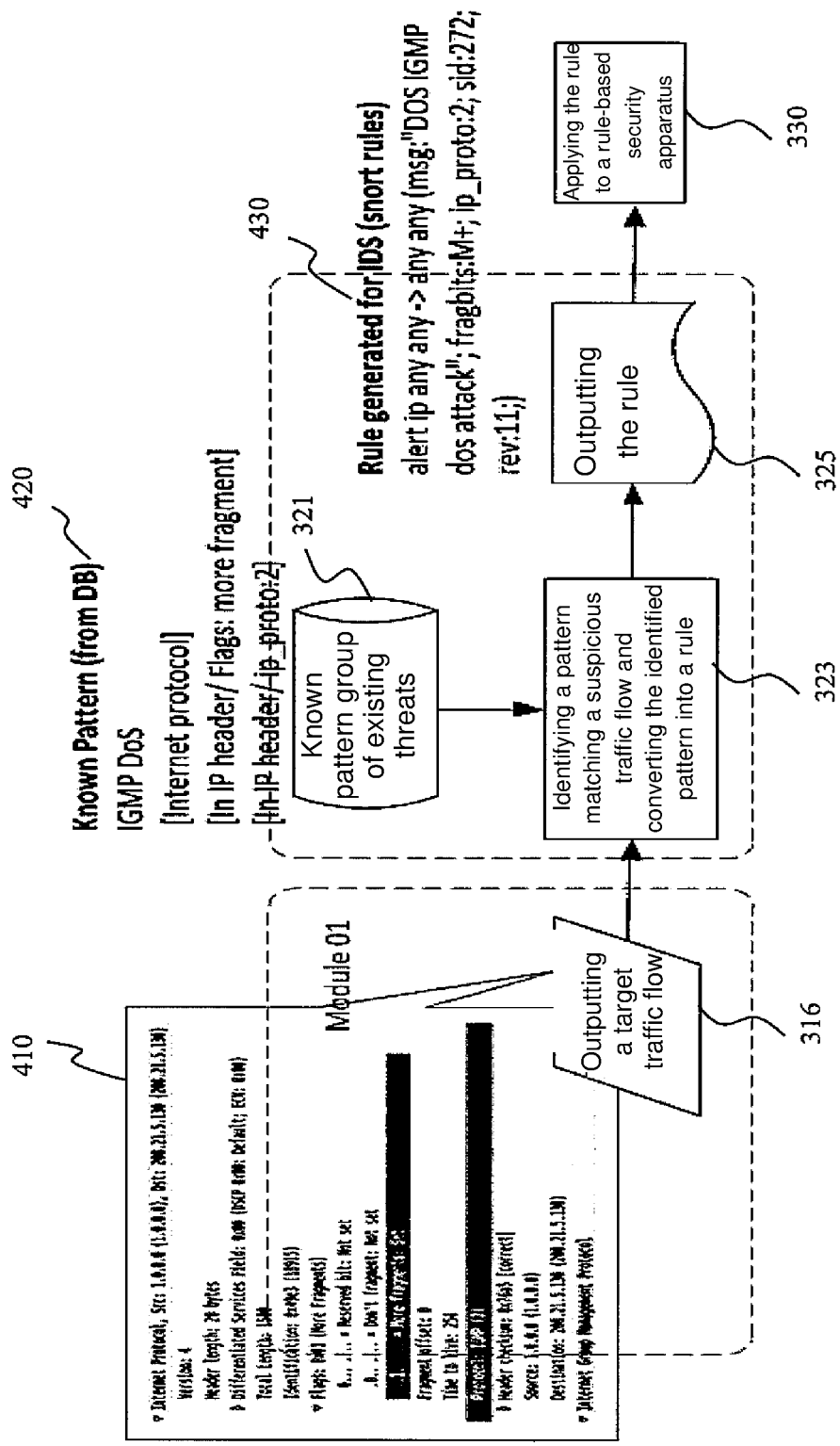
FIG. 4A shows a flowchart of a method applied to a rule generating module applied to an intrusion detection system (IDS) according to an embodiment of the present invention.
Figure 4B:
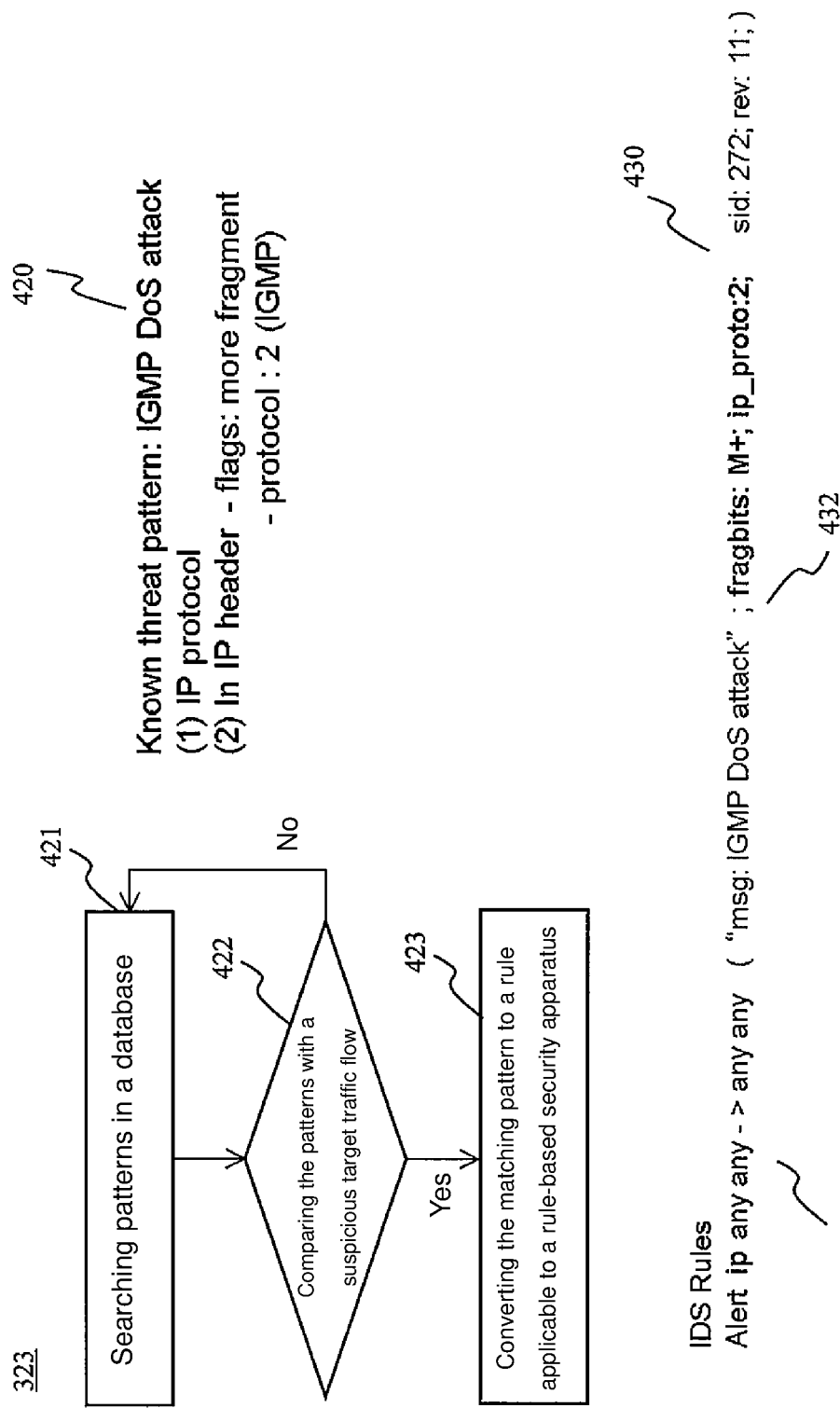
FIG. 4B shows a flowchart of a rule conversion applied to an IDS according to an embodiment of the present invention.

FIG. 4A shows a flowchart of a method applied to a rule generating module applied to an IDS according to an embodiment of the present invention. FIG. 4B shows a flowchart of a rule conversion applied to an IDS according to an embodiment of the present invention. FIG. 4C shows an example of packets included in a suspicious target traffic flow according to an embodiment of the present invention.

In step 323, a pattern of the suspicious target traffic flow is identified, and the matching pattern is converted to a rule applicable to the rule-based security. The identification process is to be described with reference to FIG. 4A and FIG. 4B.

In step 421, a database 321 containing known patterns of existing threats is searched. Because there are detection technologies for packets corresponding to known patterns of existing threats in the conventional art, such as a Protocol Analysis Module (PAM) of IBM, the database 321 may be established according to PAM technology.

In step 422, a known pattern group of existing threats in the database 321 is compared with the suspicious target traffic flow in order to identify the pattern that matches the suspicious target traffic flow. The number of pattern(s) that matches the target traffic flow may be one or plural. As shown in the embodiment in FIG. 4B, a packet 410 (as shown in FIG. 4C) in a target traffic flow outputted by the packet capturing module 310 includes features 411, 413 and 415 respectively matching a known pattern 420 (IGMP DoS) of existing threats in the database 321.

In step 423, the one or more patterns are converted into a rule applicable to the rule-base security apparatus. The one or more patterns may be combined to generate an appropriate rule applicable to the rule-based security apparatus to detect the suspicious target traffic flow and to take appropriate actions. As shown in the embodiment in FIG. 4B, the rule-based security apparatus is an IDS, so the matching pattern needs to be converted into a rule 430 applicable to the IDS. As shown, the rule 430 includes a header part 431 and an option part 432. A conventional snort is a signature-type IDS, which monitors network packets and compares the packets with a predetermined and preconfigured pattern. The feature is the foregoing pattern.

When the rule-based security apparatus is an IPS, the matching pattern needs to be converted into a rule applicable to the IPS. NIPS is an IPS of IBM.

In step 325, the rule applicable to the rule-based security apparatus is outputted.

In step 330, the rule is applied to the rule-based security apparatus.

It should be noted that, the rule-interpreting module 300 is not limited for abnormal or attack-suspicious network behaviors. For example, the rule-interpreting module 300 may also be applied for traffic flows which are not demanded to be transmitted according to some enterprise strategies, such as advertisements, social networks and websites providing video/audio data that affect normal operations of an enterprise, so as to provide a simple mechanism for establishing a new rule and thus reducing workload of network administrators.

The foregoing detailed description of the embodiments is used to further clearly describe the features and spirit of the present invention. The foregoing description for each embodiment is not intended to limit the scope of the present invention. All kinds of modifications made to the foregoing embodiments and equivalent arrangements should fall within the protected scope of the present invention. Hence, the scope of the present invention should be explained most widely according to the claims described thereafter in connection with the detailed description, and should cover all the possibly equivalent variations and equivalent arrangements.

What is claimed is:

1. A method of generating a rule and applying the rule to a rule-based security apparatus operatively coupled between an external network and an internal network resource and configured to guard against network threats, comprising steps of:

designating a suspicious timeslot based on certain abnormal network behaviors in a certain timeslot;

responsive to designating the suspicious timeslot, collecting network packets in the designated suspicious timeslot;

automatically associating the network packets in the designated suspicious timeslot to form at least one traffic flow comprising the network packets collected in the designated suspicious timeslot and corresponding to a connection to the external network;

analyzing the at least one traffic flow to select at least one suspicious target traffic flow comprising at least some of the network packets of the at least one traffic flow;

comparing known patterns with the at least one suspicious target traffic flow received from the external network to identify at least one pattern matching the at least one suspicious target traffic flow;

converting the at least one matched pattern matching the at least one suspicious target traffic flow into the rule; and applying the rule to the rule-based security apparatus to adopt a protection measure against certain traffic flow received from the external network, wherein the at least one pattern that is identified as matching the at least one suspicious target traffic flow is a plurality of patterns that are identified as matching the at least one suspicious target traffic flow and are combined when converting them into the rule.

2. The method according to claim 1, wherein the known patterns are from a database.

3. The method according to claim 2, wherein the database is established by means of a protocol analysis module (PAM).

4. An information appliance, comprising a bus; a memory connected to the bus, wherein the memory comprises a set of instructions; and a processing unit connected to the bus, wherein the processing unit is configured to execute the set of instructions to perform a method of generating a rule and applying the rule to a rule-based security apparatus operatively coupled between an external network and an internal network resource and configured to guard against network threats, comprising steps of:

designating a suspicious timeslot based on certain abnormal network behaviors in a certain timeslot;

responsive to designating the suspicious timeslot, collecting network packets in the designated suspicious timeslot;

automatically associating the network packets in the designated suspicious timeslot to form at least one traffic flow comprising the network packets collected in the designated suspicious timeslot and corresponding to a connection to the external network;

analyzing the at least one traffic flow to select at least one suspicious target traffic flow comprising at least some of the network packets of the at least one traffic flow;

comparing known patterns with the at least one suspicious target traffic flow received from the external network to identify at least one pattern matching the at least one suspicious target traffic flow;

converting the at least one matched pattern matching the at least one suspicious target traffic flow into the rule; and applying the rule to the rule-based security apparatus to adopt a protection measure against certain traffic flow received from the external network, wherein the at least one pattern that is identified as matching the at least one suspicious target traffic flow is a plurality of patterns that are identified as matching the at least one suspicious target traffic flow and are combined when converting them into the rule.

5. A computer program product comprising a set of instructions stored on a non-transitory computer-usable medium that are configured to perform, when executed by a data processing system, a method of generating a rule and applying the rule to a rule-based security apparatus operatively coupled between an external network and an internal network resource and configured to guard against network threats, comprising steps of:

designating a suspicious timeslot based on certain abnormal network behaviors in a certain timeslot;

responsive to designating the suspicious timeslot, collecting network packets in the designated suspicious timeslot;

automatically associating the network packets in the designated suspicious timeslot to form at least one traffic flow comprising the network packets collected in the designated suspicious timeslot and corresponding to a connection to the external network;

analyzing the at least one traffic flow to select at least one suspicious target traffic flow comprising at least some of the network packets of the at least one traffic flow;

comparing known patterns with the at least one suspicious target traffic flow to identify at least one pattern matching the at least one suspicious target traffic flow;

converting the at least one matched pattern matching the at least one suspicious target traffic flow into the rule; and applying the rule to the rule-based security apparatus to adopt a protection measure against certain traffic flow received from the external network, wherein the at least one pattern that is identified as matching the at least one suspicious target traffic flow is a plurality of patterns that are identified as matching the at least one suspicious target traffic flow and are combined when converting them into the rule.

* * * * *